July 31, 1951     E. TVETER     2,562,372
COMBINATION HUNTING AND FISHING BOAT

Filed Feb. 1, 1947     2 Sheets-Sheet 1

WITNESS.
INVENTOR.

July 31, 1951 — E. TVETER — 2,562,372

COMBINATION HUNTING AND FISHING BOAT

Filed Feb. 1, 1947 — 2 Sheets-Sheet 2

Patented July 31, 1951

2,562,372

UNITED STATES PATENT OFFICE 2,562,372

COMBINATION HUNTING AND FISHING BOAT

Einar Tveter, Chicago, Ill.

Application February 1, 1947, Serial No. 725,793

5 Claims. (Cl. 9—6)

The present invention relates to a boat and especially to a novel boat construction primarily adapted for duck hunting and fishing.

Among the objects of the present invention is the provision of a novel hunting and fishing boat of rigid and sturdy construction for withstanding hard and rugged use, and yet of extremely light weight so as to permit its being carried with a minimum of effort.

The invention further comprehends a novel metal boat of unique design and construction to permit its being used with relatively powerful outboard motors without danger of damage to the boat.

Another object of the present invention is the provision of a novel hunting and fishing boat that is extremely stable and one that may be used under extreme conditions without the danger of capsizing.

In the disclosed embodiment, air tanks or compartments for storing buoyant material are disposed at each side of the boat and so arranged and of such length and capacity as to retain the boat afloat even though it should become filled or substantially filled with water.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

Figure 1:
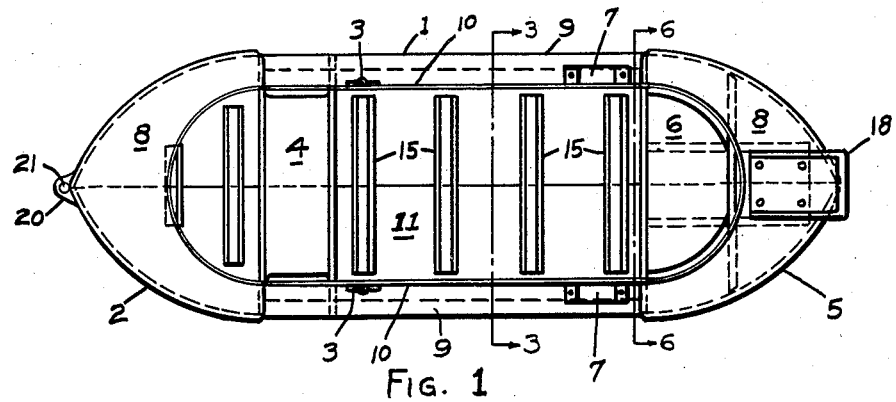
Figure 1 is a top plan view of the novel boat.
Figure 2:
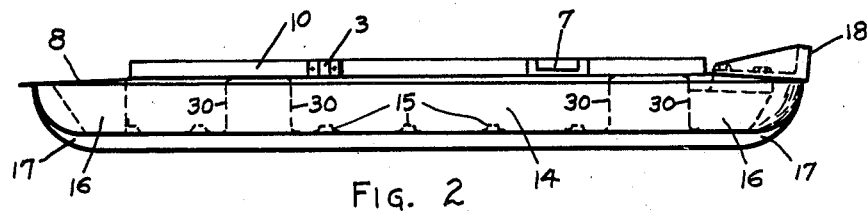
Fig. 2 is a view in side elevation of the boat.

Referring more particularly to the novel illustrative embodiment disclosed in the drawings, the novel boat which although of unusually rugged construction is also of extremely light weight and easily handled, is preferably formed of relatively thin gauge, non-corrosive and light metal and comprises a top decking 1 extending completely about the upper part of the boat and provided toward the bow 2 with conventional oar locks 3 positioned adjacent the front seat 4 and toward the stern 5 and forwardly of the rear seat 6 with conventional frog type oar locks 7.

The top deck sections 8 at the bow and at the stern are relatively wide and of similar contour and provide therebelow storage space. These deck sections join with the ends of parallel and longitudinally extending deck sections 9, 9 at the opposite sides of the boat and are formed or provided with an upstanding flange or rib 10 defining the opening for the occupants. The bottom or floor 11 of the boat is preferably formed of two centrally disposed and longitudinally extending complementary sections 12, 12 projecting outwardly and upwardly from the relatively deep keel 13 to form the sides 14, 14 and thereat suitably joined to the deck sections 8. The bottom or floor sections 12, 12 are provided with suitably spaced transverse ribs or inverted channel-shaped structural members 15 for maximum support, and at the bow and stern ends the bottom 11 is formed of complementary sections 16, 16 which combine to form the keel 17 and the bottom and sides thereat. At the stern there is provided a detachably mounted transom 18 for use in supporting an outboard motor, when desired. Thus, the similarly formed stern and bow sections and the central section are preferably separately formed and then joined by any suitable means such as riveting, welding or the like to form the complete assembly. By reason of this novel construction and assembly, boats of different overall lengths may be formed merely by increasing or decreasing the length of the central section.

The front seat 4 and the rear seat 6 are so constructed and arranged as to carry the torque stresses and also provide transverse bulkheads. In order to withstand the forward and side thrusts of an outboard motor which may be mounted on the detachable transom 18, the rear seat 6 is so placed and arranged as to carry a substantial part of the forward and side thrusts and provides a continuation of a pair of longitudinally extending stress members 19, 19 which help to support the transom.

The bottom of the boat is shown as provided with a relatively deep keel formed of the central part 13 and the end sections 17, 17 and extending from the top deck at the bow to the top deck at the stern. As will be apparent, this keel is made considerably deeper than is common practice, whereby it adds greatly to the strength of the boat by carrying longitudinal stresses. If desired, bumper keels may be provided at each side of the boat for added protection, especially in going over underwater obstructions or when the boat is moved or placed on shore.

If desired, the bow, stern and central section are preferably formed of two similar bottom sections, although the bottom sections may be of but one sheet conforming to the desired contour. As the bow and stern are made identical, they are interchangeable and after assembly a bracket 20 is attached to the bow and provided with an eye 21 for attaching a rope, while the stern is provided with two spaced relatively light weight bars 22, 22 secured to the longitudinally extending transom stress members 19, 19 and to the underside of the deck section 8, and preferably tapped or threaded for receiving the attaching bolts 23. Aligned openings are provided in the top deck 8 and transom 18 for receiving these bolts and permitting the transom to be readily attached or removed, as desired.

Figure 3:
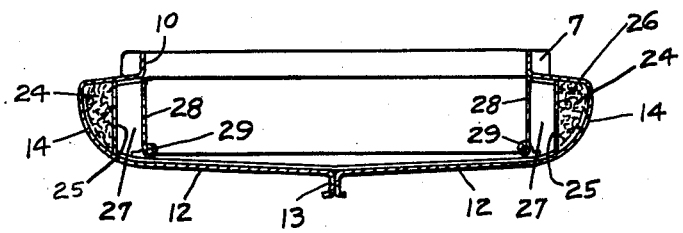
Fig. 3 is a view in vertical cross-section taken in a plane represented by the line 3—3 of Fig. 1.
Figure 4:
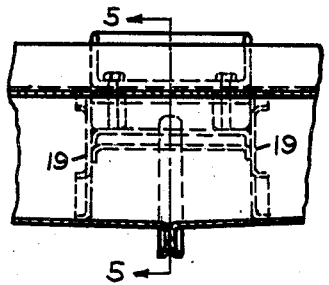
Fig. 4 is a fragmentary view in vertical cross-section through the rear of the boat to show the construction and arrangement of the transom stress members.
Figure 5:
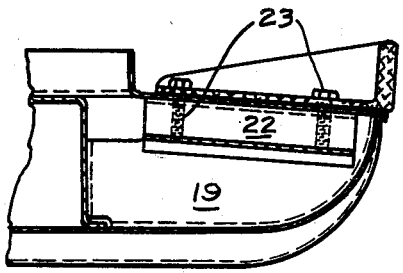
Fig. 5 is a view in vertical cross-section taken in a plane represented by the line 5—5 of Fig. 4.

As clearly shown in Fig. 3, at each side 14 of the central section and preferably extending for the length thereof, is provided an air tank or chambers 24 enclosed by a wall or plate 25 and which preferably encloses a suitable buoyant material 26. These chambers are of such length and capacity as to maintain the boat afloat even though it should completely fill with water. Adjacent each chamber is provided an additional compartment 27 adapted for storage and may receive guns, shells, decoys, fishing rods and tackle and the like. A closure 28 preferably pivotally or hingedly mounted at 29 is adapted to enclose these storage compartments and make available to the occupants maximum usable space.

The forward seat 4 is suitably braced and anchored to the interior of the boat by the spaced, depending transverse members or plates 30, 30, while the rear seat 6 is similarly mounted and braced by the spaced, depending, transverse members or plates 30, 30. The seat and the transverse members may be formed integral and the legs thereof suitably riveted or welded to the bottom of the boat and to the underside of the deck sections.

Figure 6:
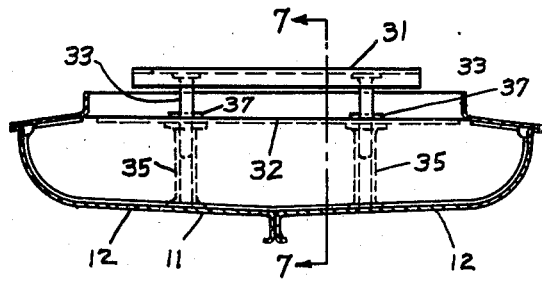
Fig. 6 is a view in vertical cross-section taken in a plane represented by the line 6—6 of Fig. 1 and showing an adjustable seat assembly.
Figure 7:
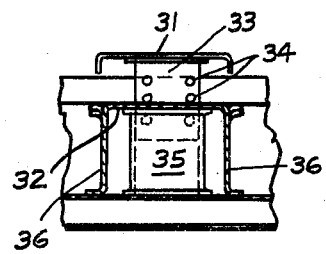
Fig. 7 is a fragmentary view in vertical cross-section taken in a plane represented by the line 7—7 of Fig. 6.

In Figs. 6 and 7, there is disclosed a seat 31 that may be adjusted to any desired height. As shown, this seat may be regulated from a lower seat 32 of which it may form a part. The adjustment is accomplished by means of a pair of spaced, depending plates 33, 33, each provided with suitably spaced openings 34 and with each plate vertically movable in a hollow support 35 and through elongated slots provided in the lower seat. Each support is suitably affixed to and braced between the lower seat 32 and the bottom of the boat and disposed longitudinally of the boat or laterally of the transverse plates or members 36, 36 supporting the seat. By inserting pins 37 through the openings 34 at the desired adjustment and these pins being of a length sufficient to project a substantial amount at each side thereof, the adjustable seat will be maintained at the desired elevation by means of the engagement of the pins upon the upper surface of the lower seat. Such an adjustable seat may be provided at either end of the boat and is especially desirable for one or more occupants while sitting in the boat in a duck blind or while fishing.

By making the boat of a light weight metal such as aluminum or aluminum alloy that will withstand hard usage and one that is extremely stable in all kinds of weather and will not capsize or sink even though it may fill with water, applicant has fulfilled a long-felt want and need in the field of hunting and fishing boats. For example, a boat constructed in accordance with the present disclosure and in which the parts have been joined either by welding or riveting, and having an overall length of approximately twelve feet and a beam of substantially four feet, weighs approximately fifty pounds. Such a boat may be readily carried by one man, a highly important advantage to sport enthusiasts. Furthermore, the novel design and manner of constructing this all-metal boat permits its ready manufacture at a very low cost.

Although I prefer to form the boat of preformed bow, stern and central sections, as will be evident from Fig. 6, the bottom and sides from bow to stern may be formed of but two continuous sections joined together at the keel and at their upper edges joined to the deck. Or the entire bottom and sides may be conformed of a single sheet of metal to the bottom of which may be secured a keel and to the upper edges of the sides the top deck.

Having thus disclosed my invention, I claim:

1. A combination duck hunting and fishing boat comprising preformed and complementary sections of light weight metal construction, said complementary sections being longitudinally joined to form the bottom and sides of the boat and their abutting edges providing a depending keel, a top deck extending completely around the boat with the opposite ends having a symmetrical contour, a transom for supporting an outboard motor at the stern of the boat, a seat adjacent the transom, longitudinally disposed stress members joined to the seat and extending beneath the top deck for supporting the transom and outboard motor, and means for detachably yet rigidly mounting the transom upon the top deck at the stern.

2. An all-metal hunting and fishing boat of light weight but rugged construction, comprising complementary bottom sections longitudinally joined to form a keel, bottom and sides of the boat, a top deck extending around the upper surface of the boat and joined to the sides, an upstanding flange provided at the top of the deck and defining an opening for the occupants, seats arranged adjacent the bow and stern and rigidly joined to the boat, a transom mounted upon the deck at the stern, and longitudinal stress members joined to the seat at the stern and extending beneath the deck adjacent thereto for supporting the transom and an outboard motor mounted thereon.

3. An all-metal hunting and fishing boat of light weight but rugged construction, comprising complementary bottom sections joined to form a keel, bottom and sides of the boat, transversely extending inverted channel-shaped members providing support for the floor, a top deck extending around the upper surface of the boat from the bow to the stern, a detachable transom adapted to be mounted upon the deck at the stern, a transversely disposed seat adjacent the stern, and longitudinally extending stress members joined to the seat and extending beneath the deck at the stern for supporting the transom and an outboard motor, whereby the seat and stress members carry torque stresses and the stress load caused by the forward and side thrust of an outboard motor mounted on the transom.

4. An all-metal hunting and fishing boat of light weight but rugged construction, comprising complementary bottom sections joined to form a keel, bottom and sides of the boat, transversely extending inverted channel-shaped members providing support for the floor, a top deck extending around the upper surface of the boat from the bow to the stern, a transom mounted upon the deck at the stern, a seat adjacent the stern, and longitudinally extending stress members joined to the seat and extending beneath the deck at the stern for supporting the transom and an outboard motor, whereby the seat and stress members carry torque stresses and the stress load caused by the forward and side thrust of an outboard motor mounted on the transom.

5. In a hunting and fishing boat constructed of light weight metal, a top deck at the stern of the boat, a transom mounted upon the deck at the stern for supporting an outboard motor, a seat adjacent the stern, and stress members secured to the seat and extending beneath the deck at the stern for supporting the transom and motor and whereby the seat and stress members carry the torque stresses and the stress load caused by the forward and side thrust of the motor.

EINAR TVETER.

REFERENCES CITED

The following references are of record in the file of this patent:

UNITED STATES PATENTS

| Number | Name | Date |
| --- | --- | --- |
| 1,035,046 | Pitre | Aug. 6, 1912 |
| 1,118,208 | McLaren | Nov. 24, 1914 |
| 1,190,371 | Boulton | July 11, 1916 |
| 1,667,561 | Mediavilla | Apr. 24, 1928 |
| 1,761,451 | Ohnstrand | June 3, 1930 |
| 2,251,621 | Van Hoorn | Aug. 5, 1941 |
| 2,441,999 | Fulke | May 25, 1948 |
| 2,453,463 | Sherman | Nov. 9, 1948 |

FOREIGN PATENTS

| Number | Country | Date |
| --- | --- | --- |
| 8,446 | Great Britain | June 7, 1915 |
| 9,275 | Great Britain | May 9, 1893 |
| 350,536 | Great Britain | June 21, 1931 |